(12) United States Patent
Katsuma

(10) Patent No.: US 6,498,689 B2
(45) Date of Patent: Dec. 24, 2002

(54) OBJECTIVE LENS FOR OPTICAL RECORDING MEDIA AND OPTICAL PICKUP APPARATUS USING THE SAME

(75) Inventor: Toshiaki Katsuma, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/925,310

(22) Filed: Aug. 10, 2001

(65) Prior Publication Data
US 2002/0041450 A1 Apr. 11, 2002

(30) Foreign Application Priority Data
Aug. 11, 2000 (JP) ......................................... 2000-245194

(51) Int. Cl.$^7$ ......................... G02B 13/18; G02B 21/02; G02B 7/00
(52) U.S. Cl. ................... 359/719; 359/661; 369/112.01
(58) Field of Search ............................... 3549/718, 719, 3549/661; 369/112.01

(56) References Cited

U.S. PATENT DOCUMENTS 6,411,442 B1 * 6/2002 Ota et al. ................. 250/201.5
6,411,587 B1 * 6/2002 Arai et al. ............. 369/112.01

FOREIGN PATENT DOCUMENTS

| JP | 8-62493 | 3/1996 |
| JP | 9-145994 | 6/1997 |
| JP | 10-332906 | 12/1998 |

* cited by examiner

Primary Examiner—Scott J. Sugarman
(74) Attorney, Agent, or Firm—Snider & Associates; Ronald R. Snider

(57) ABSTRACT

An objective lens for optical recording media is constituted by two or three lenses cemented together and used for recording or reproducing two kinds of optical recording media having respective thicknesses different from each other with two light beams having wavelengths $\lambda_1$ and $\lambda_2$ different from each other. The cemented face exhibits negative and positive refracting powers with respect to light beams having wavelengths $\lambda_1$ and $\lambda_2$, respectively, according to the wavelength-dependent difference in refractive index of materials constituting the respective lenses.

18 Claims, 9 Drawing Sheets

EXAMPLE 1
WHEN LENS IS USED FOR DVD (WAVELENGTH IN USE: 650nm)

EXAMPLE 1
WHEN LENS IS USED FOR CD-R (WAVELENGTH IN USE: 780nm)

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 1
WHEN LENS IS
USED FOR DVD
(WAVELENGTH IN USE: 650nm)
NA 0.60

EXAMPLE 1
WHEN LENS IS
USED FOR CD-R
(WAVELENGTH IN USE: 780nm)
NA 0.45

EXAMPLE 2
WHEN LENS IS
USED FOR DVD
(WAVELENGTH IN USE: 650nm)
NA 0.60

EXAMPLE 2
WHEN LENS IS
USED FOR CD-R
(WAVELENGTH IN USE: 780nm)
NA 0.45

EXAMPLE 3
WHEN LENS IS
USED FOR DVD
(WAVELENGTH IN USE: 650nm)
NA 0.60

EXAMPLE 3
WHEN LENS IS
USED FOR CD-R
(WAVELENGTH IN USE: 780nm)
NA 0.45

EXAMPLE 4
WHEN LENS IS
USED FOR DVD
(WAVELENGTH IN USE: 650nm)
NA 0.60

EXAMPLE 4
WHEN LENS IS
USED FOR CD-R
(WAVELENGTH IN USE: 780nm)
NA 0.45

EXAMPLE 5
WHEN LENS IS
USED FOR DVD
(WAVELENGTH IN USE: 650nm)
NA 0.60

EXAMPLE 5
WHEN LENS IS
USED FOR CD-R
(WAVELENGTH IN USE: 780nm)
NA 0.45

OBJECTIVE LENS FOR OPTICAL RECORDING MEDIA AND OPTICAL PICKUP APPARATUS USING THE SAME

RELATED APPLICATIONS

This application claims the priority of Japanese Patent Application No. 2000-245194 filed on Aug. 11, 2000, which is incorporated herein by reference.

BACKGROUND OF THE INVENTION

1. Field of the Invention

The present invention relates to an objective lens and optical pickup apparatus for recording and reproducing signals, which are commonly usable for two or more kinds of optical recording media having thicknesses different from each other. In particular, the present invention relates to an objective lens which, when light beams for irradiating the optical recording media have wavelengths different from each other according to the kinds of optical recording media, can efficiently converge the respective light beams onto their corresponding optical recording media; and an optical pickup apparatus using the same.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using a single optical pickup apparatus has been known.

In such two kinds of optical recording media, for example, visible light at about 650 nm is used for DVD in order to improve the recording density, whereas near-infrared light at about 780 nm is required to be used for CD-R since it has no sensitivity for light in the visible region. An optical pickup apparatus which can be used in common for both of them is based on a dual-wavelength beam type which uses two light beams having wavelengths different from each other.

In the two optical recording media exemplified above, however, the disc thickness of the CD-R is fixed to 1.2 mm whereas the DVD in use mostly has a thickness of 0.6 mm. Therefore, the individual wavelengths of light for reproducing or recording are needed to be securely converged at their predetermined positions different from each other.

Under such circumstances, a system in which two objective lenses having converging actions different from each other are made switchable depending on the optical recording media subjected to reproducing or recording has been known. However, it complicates the structure of optical pickup apparatus and opposes the demands for compactness and lower cost.

On the other hand, it has recently been known to use a multifocal lens composed of a diffractive optical element or a plurality of circular strip divisions for an objective lens part of an optical pickup apparatus (Japanese Unexamined Patent Publication No. 8-62493, Japanese Unexamined Patent Publication No. 9-145994, and the like).

In the apparatus using the above-mentioned diffractive optical element, however, a noise light component of an order different from that contributing to the recording and reproducing is emitted from the diffractive optical element. In the apparatus using the above-mentioned multifocal lens, the light transmitted through a circular strip division other than that contributing to the recording and reproducing at that time is noise light. Due to these noise light components, the S/N ratio at the recording and reproducing deteriorates.

SUMMARY OF THE INVENTION

In view of the circumstances mentioned above, it is an object of the present invention to provide a compact, inexpensive objective lens with a favorable S/N ratio for optical recording media, which can favorably converge two wavelengths of light onto their corresponding recording surfaces of optical recording media having respective thicknesses without complicating the structure of optical pickup apparatus; and an optical pickup apparatus using the same.

The present invention provides an objective lens for optical recording media, the objective lens being constituted by two lenses cemented together and used for recording or reproducing two kinds of optical recording media having thicknesses different from each other with two light beams having wavelengths different from each other, respectively;

the objective lens satisfying the following conditional expression (1) with respect to a light beam having a wavelength $\lambda_1$ used for recording or reproducing one of the two optical recording media, and the following conditional expression (2) with respect to a light beam having a wavelength $\lambda_2$ used for recording or reproducing the other of the two optical recording media:

$$N_{L\lambda 1} > N_{D\lambda 1} \quad (1)$$

$$N_{L\lambda 2} < N_{D\lambda 2} \quad (2)$$

where $N_{L\lambda 1}$ is the refractive index of the lens on the light source side with respect to the light beam having the wavelength $\lambda_1$;

$N_{D\lambda 1}$ is the refractive index of the lens on the optical recording media side with respect to the light beam having the wavelength $\lambda_1$;

$N_{L\lambda 2}$ is the refractive index of the lens on the light source side with respect to the light beam having the wavelength $\lambda_2$; and $N_{D\lambda 2}$ is the refractive index of the lens on the optical recording media side with respect to the light beam having the wavelength $\lambda_2$.

Also, the present invention provides an objective lens for optical recording media, the objective lens being constituted by two lenses cemented together and used for recording or reproducing two kinds of optical recording media having thicknesses different from each other with two light beams having wavelengths different from each other, respectively;

the objective lens satisfying the following conditional expression (3) with respect to a light beam having a wavelength $\lambda_1$ used for recording or reproducing one of the two optical recording media, and the following conditional expression (4) with respect to a light beam having a wavelength $\lambda_2$ used for recording or reproducing the other of the two optical recording media:

$$N_{L\lambda 1} < N_{D\lambda 1} \quad (3)$$

$$N_{L\lambda 2} > N_{D\lambda 2} \quad (4)$$

where $N_{L\lambda 1}$ is the refractive index of the lens on the light source side with respect to the light beam having the wavelength $\lambda_1$;

$N_{D\lambda_1}$ is the refractive index of the lens on the optical recording media side with respect to the light beam having the wavelength $\lambda_1$;

$N_{L\lambda_2}$ is the refractive index of the lens on the light source side with respect to the light beam having the wavelength $\lambda_2$; and $N_{D\lambda_2}$ is the refractive index of the lens on the optical recording media side with respect to the light beam having the wavelength $\lambda_2$.

Further, the present invention provides an objective lens for optical recording media, the objective lens being constituted by two lenses cemented together and used for recording or reproducing two kinds of optical recording media having thicknesses different from each other with two light beams having wavelengths different from each other, respectively;

assuming that the optical recording medium recorded or reproduced with a light beam having a wavelength $\lambda_1$ and the optical recording medium recorded or reproduced with a light beam having a wavelength $\lambda_2$ have respective thicknesses $t_1$ and $t_2$ satisfying the condition of $t_1 < t_2$, the objective lens satisfying the following conditional expression (5) when the cemented face of the cemented lenses is convex toward the light source, and the following conditional expression (6) when the cemented face of the cemented lenses is convex toward the optical recording media:

$$N_{L\lambda_1} > N_{D\lambda_1} \text{ and } N_{L\lambda_2} < N_{D\lambda_2} \quad (5)$$

$$N_{L\lambda_1} < N_{D\lambda_1} \text{ and } N_{L\lambda_2} > N_{D\lambda_2} \quad (6)$$

where $N_{L\lambda_1}$ is the refractive index of the lens on the light source side with respect to the light beam having the wavelength $\lambda_1$;

$N_{D\lambda_1}$ is the refractive index of the lens on the optical recording media side with respect to the light beam having the wavelength $\lambda_1$;

$N_{L\lambda_2}$ is the refractive index of the lens on the light source side with respect to the light beam having the wavelength $\lambda_2$; and $N_{D\lambda_2}$ is the refractive index of the lens on the optical recording media side with respect to the light beam having the wavelength $\lambda_2$.

Furthermore, the present invention provides an objective lens for optical recording media, the objective lens being constituted by three lenses cemented together and used for recording or reproducing two kinds of optical recording media having thicknesses different from each other with two light beams having wavelengths different from each other, respectively;

assuming that the optical recording medium recorded or reproduced with a light beam having a wavelength $\lambda_1$ and the optical recording medium recorded or reproduced with a light beam having a wavelength $\lambda_2$ have respective thicknesses $t_1$ and $t_2$ satisfying the condition of $t_1 < t_2$, the objective lens satisfying the following conditional expression (7) when the cemented face between the first and second lenses from the light source side is convex toward the light source:

$$N_{1\lambda_1} > N_{2\lambda_1} \text{ and } N_{1\lambda_2} < N_{2\lambda_2} \quad (7)$$

the objective lens satisfying the following conditional expression (8) when the cemented face between the first and second lenses from the light source side is convex toward the optical recording media:

$$N_{1\lambda_1} < N_{2\lambda_1} \text{ and } N_{1\lambda_2} > N_{2\lambda_2} \quad (8)$$

the objective lens satisfying the following conditional expression (9) when the cemented face between the second and third lenses from the light source side is convex toward the light source:

$$N_{2\lambda_1} > N_{3\lambda_1} \text{ and } N_{2\lambda_2} < N_{3\lambda_2} \quad (9)$$

the objective lens satisfying the following conditional expression (10) when the cemented face between the second and third lenses from the light source side is convex toward the optical recording media:

$$N_{2\lambda_1} < N_{3\lambda_1} \text{ and } N_{2\lambda_2} > N_{3\lambda_2} \quad (10)$$

where $N_{1\lambda_1}$ is the refractive index of the first lens from the light source side with respect to the light beam having the wavelength $\lambda_1$;

$N_{2\lambda_1}$ is the refractive index of the second lens from the light source side with respect to the light beam having the wavelength $\lambda_1$;

$N_{3\lambda_1}$ is the refractive index of the third lens from the light source side with respect to the light beam having the wavelength $\lambda_1$;

$N_{1\lambda_2}$ is the refractive index of the first lens from the light source side with respect to the light beam having the wavelength $\lambda_2$;

$N_{2\lambda_2}$ is the refractive index of the second lens from the light source side with respect to the light beam having the wavelength $\lambda_2$; and $N_{3\lambda_2}$ is the refractive index of the third lens from the light source side with respect to the light beam having the wavelength $\lambda_2$.

Preferably, the objective lens in this case satisfies the following conditional expressions (11) and (12):

$$N_{1\lambda_1} = N_{3\lambda_1} \quad (11)$$

$$N_{1\lambda_2} = N_{3\lambda_2} \quad (12)$$

Preferably, the first and third lenses from the light source side are formed from the same material.

The cemented faces of the lenses may be made aspheric.

In each of the above-mentioned objective lenses for optical recording media, one of the light beams having wavelengths $\lambda_1$ and $\lambda_2$ may be a light beam having a wavelength of 650 nm used for recording or reproducing DVD, whereas the other may be a light beam having a wavelength of 780 nm used for recording or reproducing CD-R.

The present invention provides an optical pickup apparatus comprising any of the above-mentioned objective lens for optical recording media.

In general, objective lenses for optical discs commonly used for recording/reproducing various kinds of discs having respective thicknesses different from each other have the following problems in general.

Namely, if an objective lens designed for a relatively thick disc is used for recording/reproducing a relatively thin disc, a negative spherical aberration will occur, whereby recording/reproducing cannot be effected sufficiently.

If an objective lens designed for a relatively thin disc is used for recording/reproducing a relatively thick disc, by contrast, a positive spherical aberration will occur, whereby recording/reproducing cannot be effected sufficiently.

For example, if an objective lens designed for CD-R (having a thickness of 1.2 mm) is used for DVD (having a thickness of 0.6 mm), a negative spherical aberration will occur, whereby recording/reproducing cannot be effected sufficiently.

If an objective lens designed for DVD (having a thickness of 0.6 mm) is used for CD-R (having a thickness of 1.2 mm), by contrast, a positive spherical aberration will occur, whereby recording/reproducing cannot be effected sufficiently.

Therefore, when a lens is to be designed such that both of the above-mentioned thick and thin discs can be recorded/reproduced, lens design parameters are required to be such that the spherical aberration changes in opposite directions depending on whether the above-mentioned thick or thin disc is used.

When a lens surface is convex onto the air side at the boundary between the lens and air, i.e., it is a lens surface having a positive refracting power, the spherical aberration will change in the negative direction as the curvature of the lens surface increases in general.

When the lens surface is concave onto the air side, i.e., it is a lens surface having a negative refracting power, by contrast, the spherical aberration will change in the positive direction as the curvature of the lens surface increases in general.

A lens constituted by a single group having a single element configuration has only boundary faces in contact with the air. Therefore, as can be seen from the foregoing, this lens has no lens surface which can change the spherical aberration in both of the positive and negative directions at the same time when the curvature of boundary faces is changed.

By contrast, a cemented lens can have either a positive or negative refracting power due to the difference in magnitude of refractive indices of materials in front and rear of the cemented face even when the surface form is the same.

Namely, when the cemented face is convex toward the light source, for example, if the lens material positioned on the light source side of the cemented face has a refractive index lower than that of the lens material positioned on the optical recording media side of the cemented face, then the cemented face can be formed as a lens surface having a positive refracting power. If the lens material positioned on the light source side of the cemented face has a refractive index higher than that of the lens material positioned on the optical recording media side of the cemented face, by contrast, then the cemented face can be formed as a lens surface having a negative refracting power.

Thus, the cemented face can be made as a lens surface having a positive refracting power or a lens surface having a negative refracting power according to the difference in refractive index on the front and rear sides thereof even when the surface form is the same. When the curvature of the cemented face is made large, the spherical aberration can be changed in the negative or positive direction according to the refracting power of the lens surface at this time.

Taking account of such a property of the cemented face, the present invention is achieved.

When the wavelength of light employed varies depending on the disc thickness, the wavelength-dependent difference in refractive index of the material constituting the lens due to the above-mentioned property of the cemented face is utilized so as to exhibit a negative refracting power (or positive refracting power) and a positive refracting power (or negative refracting power) with respect to the light beams having wavelengths $\lambda_1$ and $\lambda_2$, respectively.

For example, suppose a case where a cemented lens is used as an objective lens for an optical disc for recording/reproducing discs having thicknesses of $t_1$ and $t_2$ ($t_1 < t_2$) with light beams having wavelengths $\lambda_1$ and $\lambda_2$, respectively, whereas its cemented face is convex toward the light source. In this case, if the lens material on the light source side of the cemented face has a refractive index higher than that of the lens material on the optical recording media side with respect to the light beam having the wavelength $\lambda_1$ and has a refractive index lower than that of the lens material on the optical recording media side with respect to the light beam having the wavelength $\lambda_2$, then the cemented face can exhibit negative and positive refracting powers with respect to the light beams having wavelengths $\lambda_1$ and $\lambda_2$, respectively.

As the curvature of the cemented face is enhanced, the spherical aberration can be changed in the positive direction with respect to the light beam having the wavelength $\lambda_1$, and in the negative direction with respect to the light beam having the wavelength $\lambda_2$. Thus, lens design parameters can exist such that the spherical aberration changes in opposite directions depending on whether a relatively thick or thin disc is used, thereby making it possible to construct an objective lens which can record/reproduce discs having thicknesses different from each other.

When the cemented face is convex toward the optical recording media in the above-mentioned example, effect similar to those mentioned above can be obtained if the relationship between the refractive indices of lens materials is in the reverse of that mentioned above.

Though Japanese Unexamined Patent Publication No. 10-332906 and Japanese Patent Publication No. 2727373 disclose cemented objective lenses for optical pickups, each of them is assumed to use a single wavelength of light, whereby they are hard to exhibit the effects of the present invention.

DESCRIPTION OF THE PREFERRED EMBODIMENTS

Figure 1A:
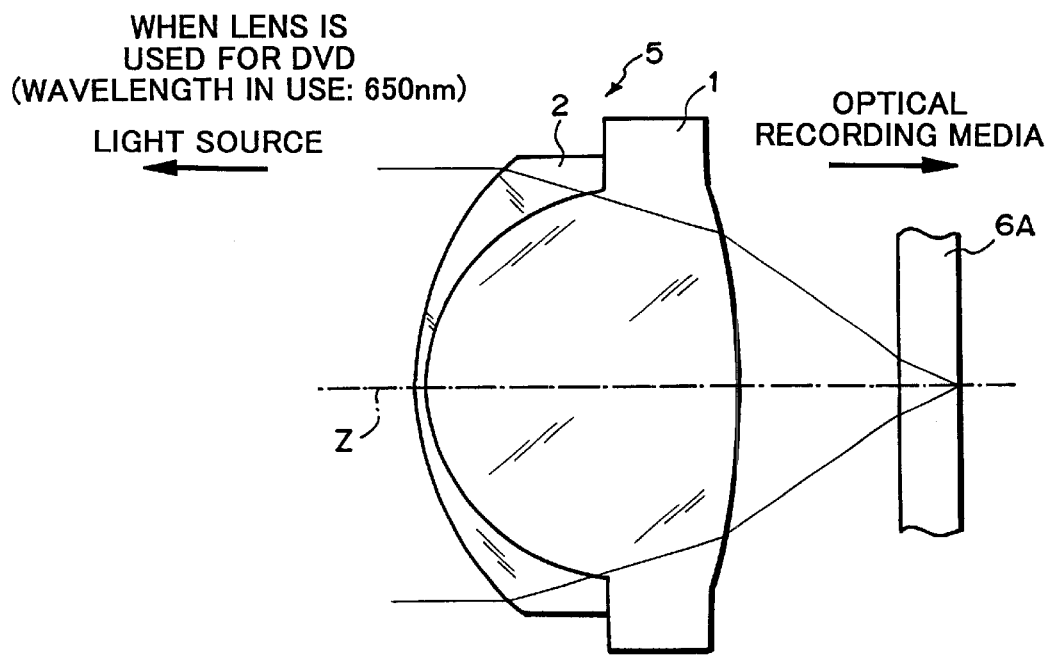
FIGS. 1A and 1B are schematic views showing the states where the objective lens in accordance with Example 1 of the present invention is used for DVD and CD-R, respectively.

In the following, an embodiment of the present invention will be explained with reference to the drawings.

First, with reference to FIG. 11, an optical pickup apparatus using the objective lens for optical recording media in accordance with an embodiment of the present invention will be explained.

In this optical pickup apparatus, a semiconductor laser 11B and a semiconductor laser 11C output a laser beam 12 when power is supplied thereto from an LD power source 11A, a half mirror 13 reflects the laser beam 12, a collimator lens 4 turns thus reflected laser beam 12 into parallel light, and an objective lens 5 converts the parallel light into convergent light, with which a recording region 6P of an optical disc 6 is irradiated. The semiconductor laser 11B is a light source for outputting a laser beam in a near-infrared region having a wavelength of about 780 nm for CD-R (recordable optical disc), whereas the semiconductor laser 11C is a light source for outputting a laser beam, for example, in a visible region having a wavelength of 650 nm for DVD (digital versatile disc). The laser beam 12 outputted from one of the semiconductor lasers 11B, 11C irradiates the half mirror 13 by way of a half mirror 11D. A changeover switch 11E is disposed between the LD power source 11A and the semiconductor lasers 11B, 11C. As the changeover switch 11E is operated, power is supplied to one of the semiconductor lasers 11B, 11C.

In the recording region 6P, pits carrying signal information are arranged in a track. The reproducing reflected light of laser beam 12 from the recording region 6P is made incident on the half mirror 13 by way of the objective lens 5 and collimator lens 4 while carrying the signal information, and is transmitted through the half mirror 13, so as to be made incident on a four-part photodiode 7. The respective quantities of light received at the four separate diode positions are arithmetically operated in this photodiode 7, whereby data signals and respective error signals for focusing and tracking are obtained.

Since the half mirror 13 is inserted in the optical path of the return light from the optical disc 6 in a state tilted by 45°, it acts like a cylindrical lens, so that the light beam transmitted through the half mirror 13 has an astigmatism, whereby the amount of focusing error is determined according to the form of the beam spot of return light on the four-part photodiode 7. Here, the collimator lens 4 can be omitted depending on the circumstances. Also, a grating may be inserted between the semiconductor lasers 11B, 11C and the half mirror 13, such that tracking errors can be detected by use of three beams.

Thus, the optical pickup apparatus in accordance with this embodiment is configured such that signals can be recorded and reproduced for any optical disc 6 of CD-R and DVD.

Here, each of the CD-R and DVD has a protective sheet made of PC (polycarbonate).

Meanwhile, the geometric thickness of CD-R is standardized at 1.2 mm, and one having a refractive index of 1.55 is often used. As for the DVD, on the other hand, one having a geometric thickness of 0.6 mm and a refractive index of 1.58 is often used. Consequently, for securely carrying out focusing on each optical disc 6, it is necessary to provide a configuration yielding focusing actions different from each other for the respective wavelengths of light for recording/reproducing the different kinds of discs.

Figure 11:
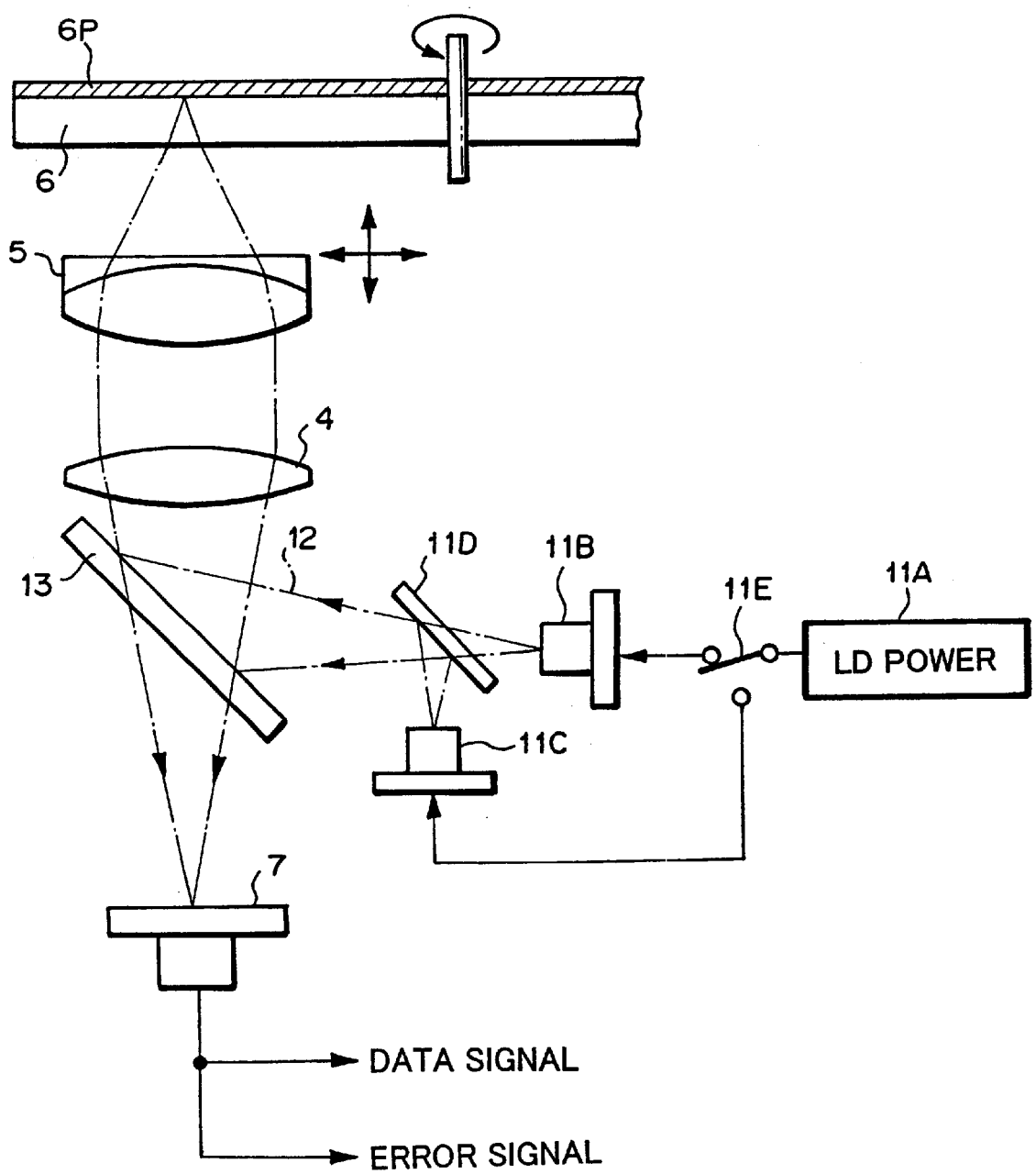
FIG. 11 is a schematic view showing the optical pickup apparatus in accordance with an embodiment of the present invention.

Therefore, the above-mentioned optical pickup apparatus is provided with the objective lens 5 in which a plurality of lenses 1, 2 whose refractive index changing ratios differ from each other according to wavelengths are cemented together as shown in FIG. 11, so that both CD-R and DVD can be recorded and reproduced.

When a DVD is disposed at a predetermined position (on a turntable) for recording or reproducing, the laser beam 12 having a wavelength of 650 nm ($\lambda_1$) from the semiconductor laser 11C is made incident on the objective lens 5 while in a substantially parallel state. In this case, the incident laser beam 12 is converged onto a recording surface of the DVD by the objective lens 5.

When a CD-R is disposed at a predetermined position (on the turntable) for recording or reproducing, the laser beam 12 having a wavelength of 780 nm ($\lambda_2$) from the semiconductor laser 11B is made incident on the objective lens 5 while in a substantially parallel state. In this case, the incident laser beam 12 is converged onto a recording surface of the CD-R by the objective lens 5.

Here, in the objective lens 5, the lens on the light source side and the lens on the optical recording media side in the cemented lenses have respective refractive index differences in polarities different from each other according to wavelengths.

The above-mentioned objective lens 5 will now be explained specifically with reference to Examples 1 to 5.

EXAMPLES

Example 1

When a DVD 6A is disposed at a predetermined position (on a turntable) for recording or reproducing as shown in FIG. 1A, the laser beam 12 having a wavelength of 650 nm ($\lambda_1$) is made incident on the objective lens 5 while in a substantially parallel state. In this case, the incident laser beam 12 is converged onto a recording surface of the DVD 6A by the objective lens 5.

Figure 1B:
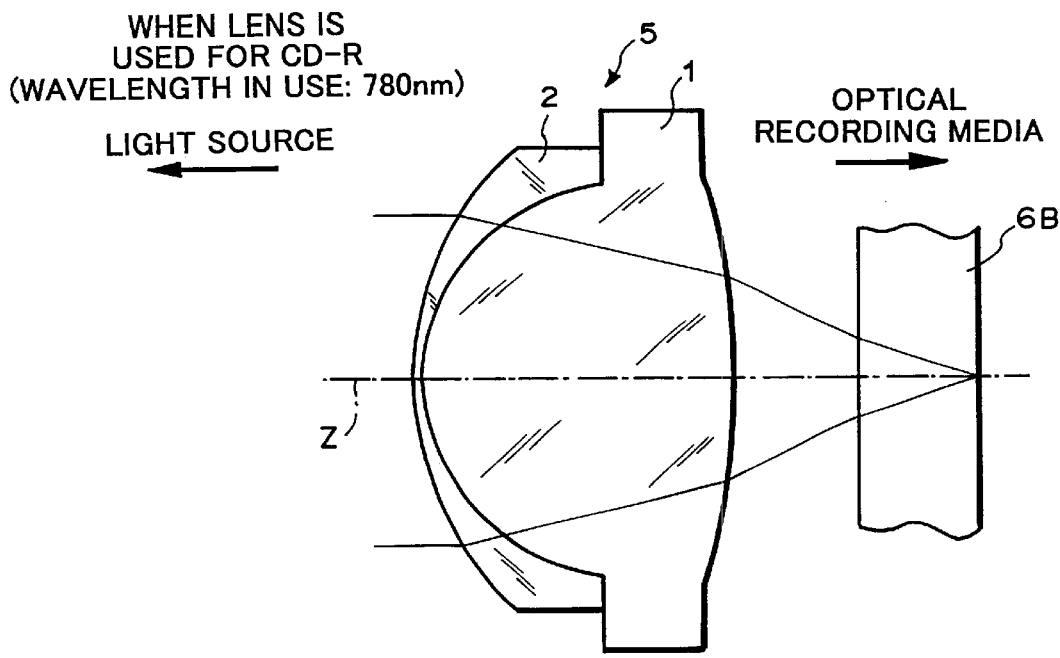
Figure 2A:
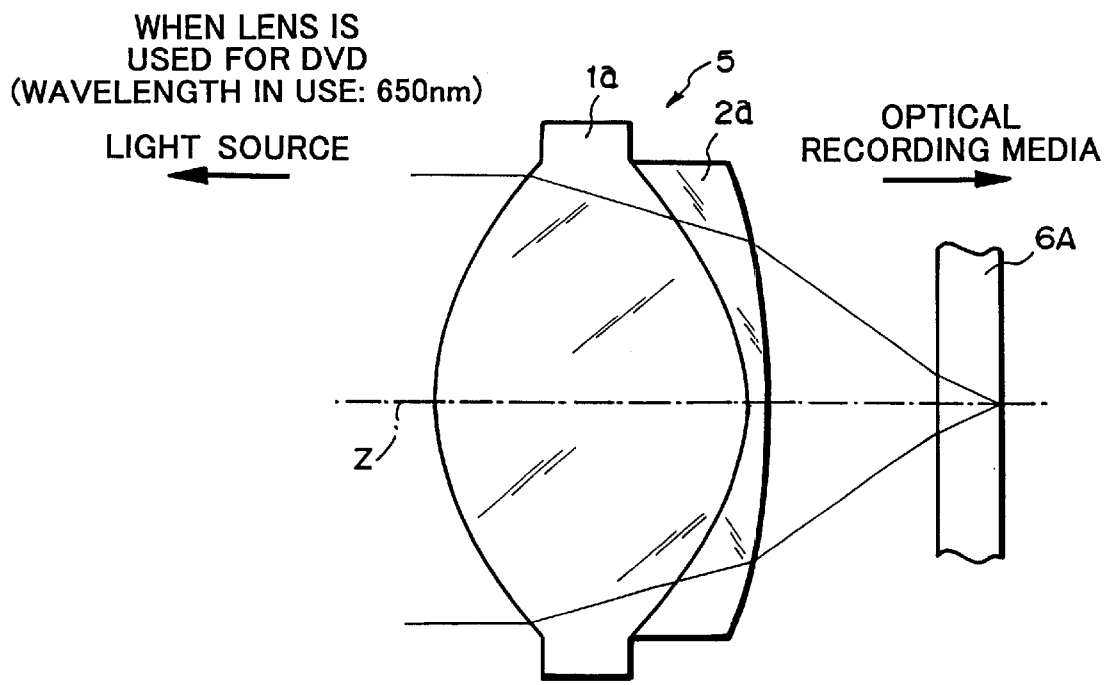
FIGS. 2A and 2B are schematic views showing the states where the objective lens in accordance with Example 2 of the present invention is used for DVD and CD-R, respectively.
Figure 2B:
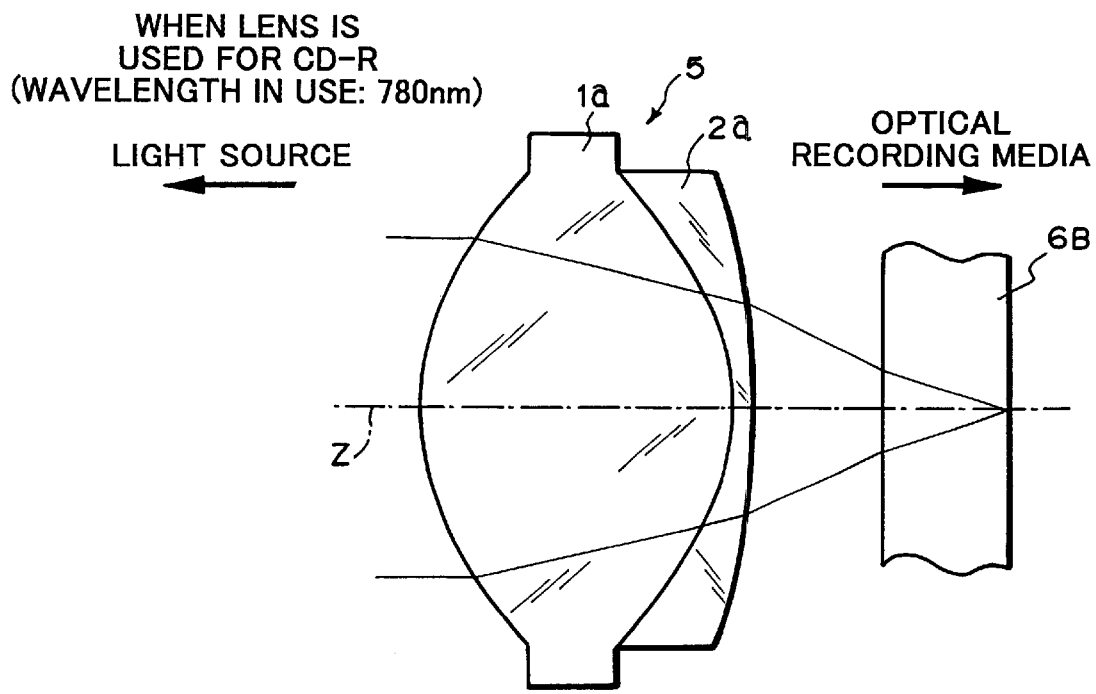
Figure 3A:
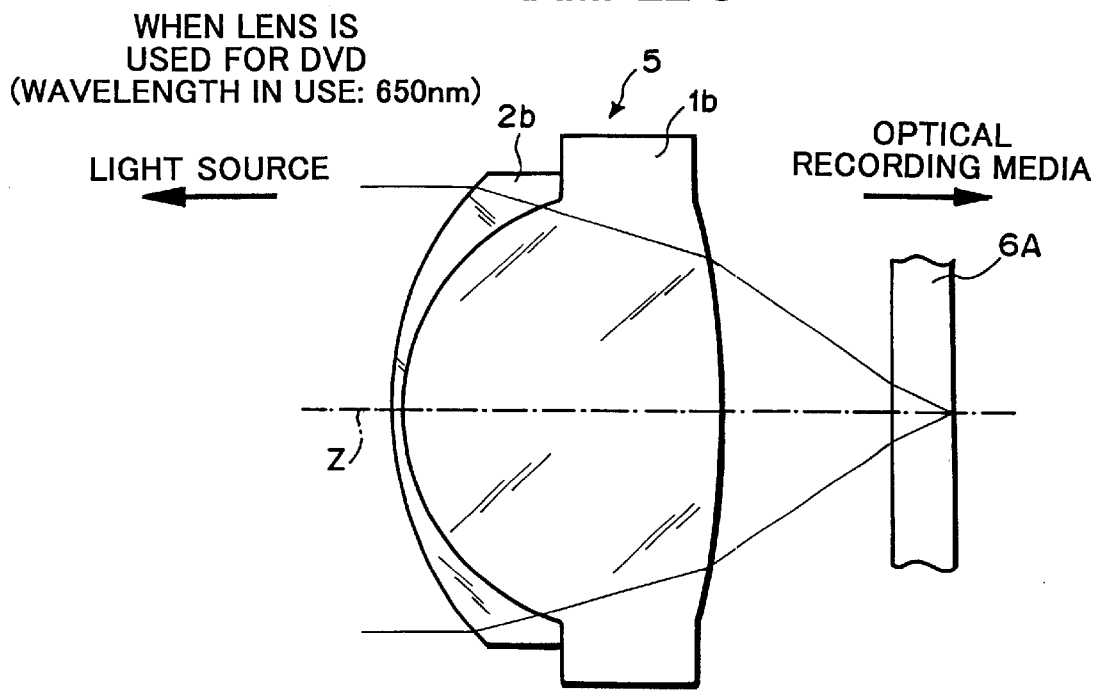
FIGS. 3A and 3B are schematic views showing the states where the objective lens in accordance with Example 3 of the present invention is used for DVD and CD-R, respectively.
Figure 3B:
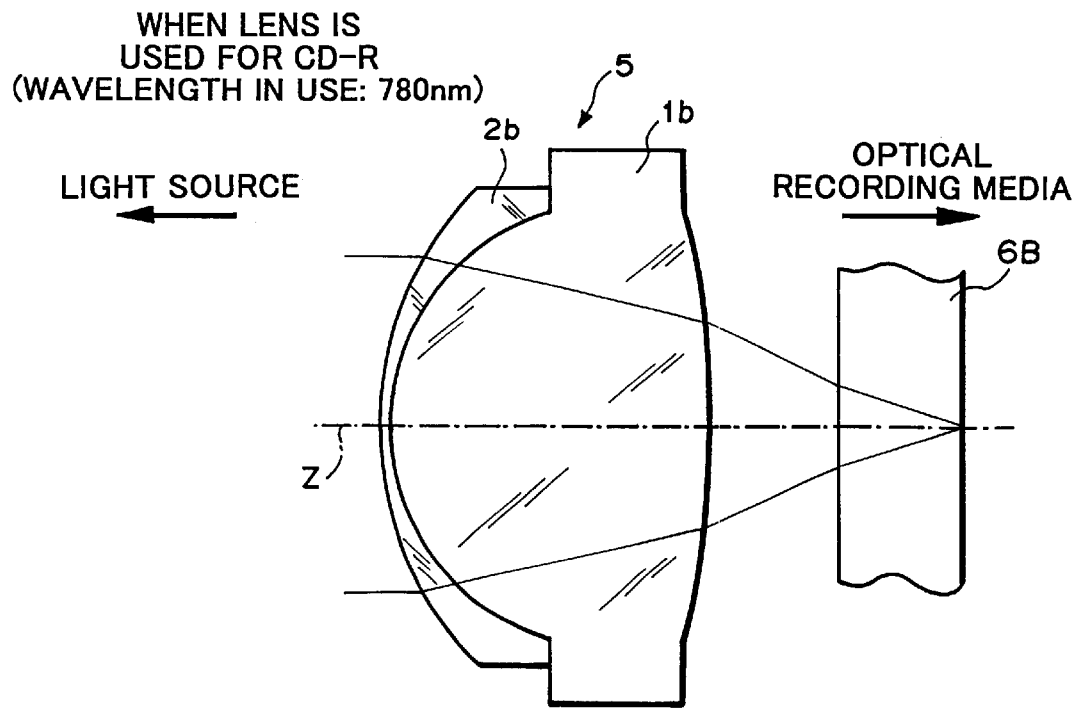
Figure 4A:
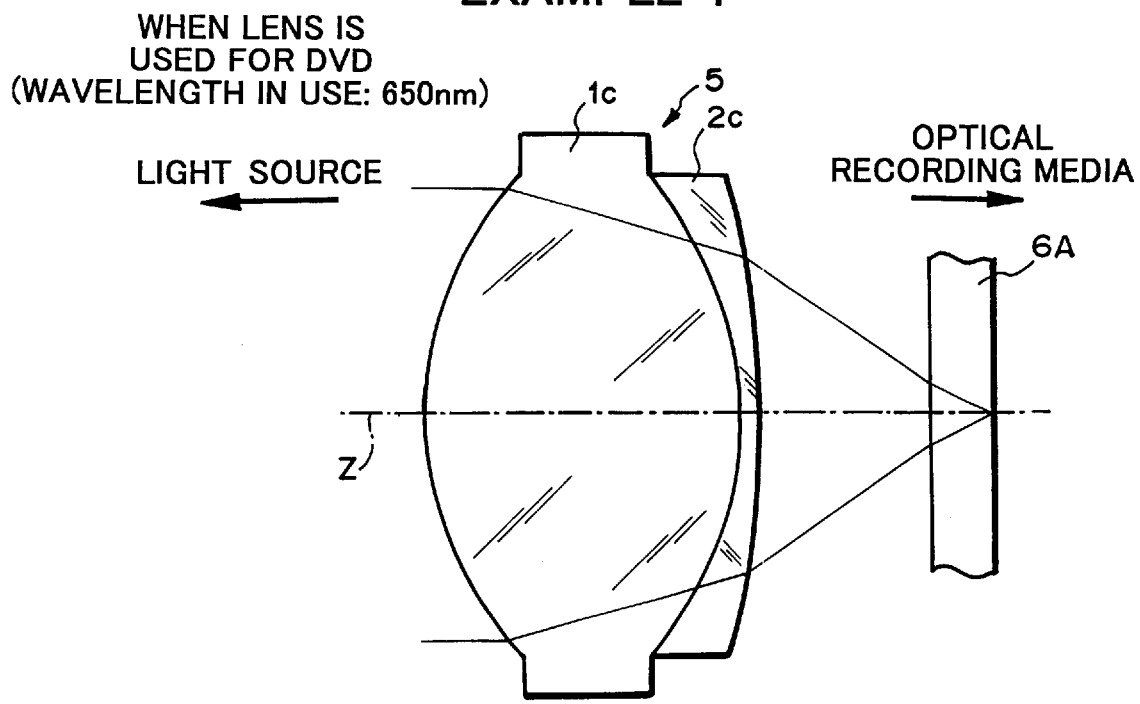
FIGS. 4A and 4B are schematic views showing the states where the objective lens in accordance with Example 4 of the present invention is used for DVD and CD-R, respectively.
Figure 4B:
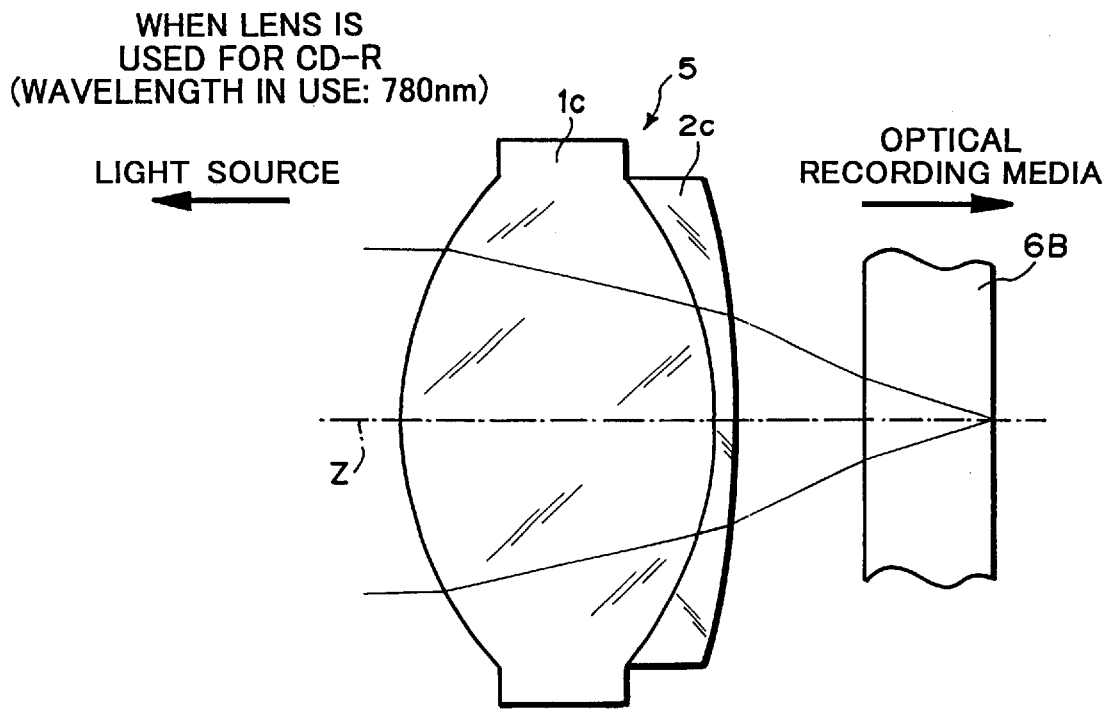
Figure 5A:
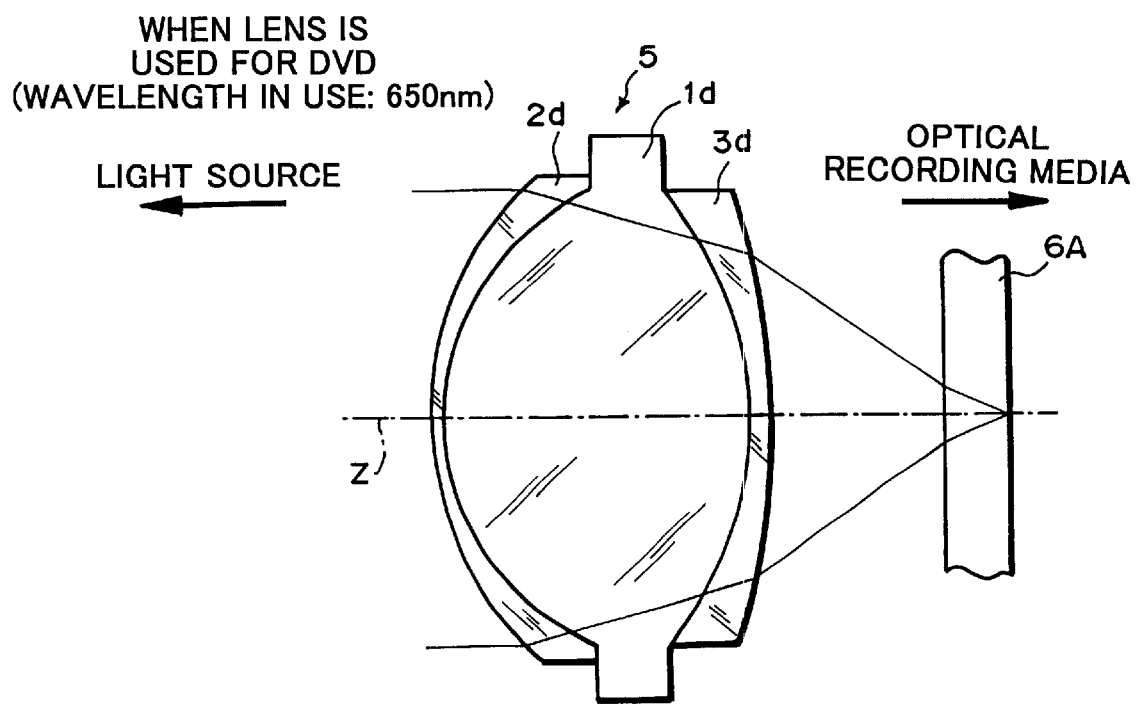
FIGS. 5A and 5B are schematic views showing the states where the objective lens in accordance with Example 5 of the present invention is used for DVD and CD-R, respectively.
Figure 5B:
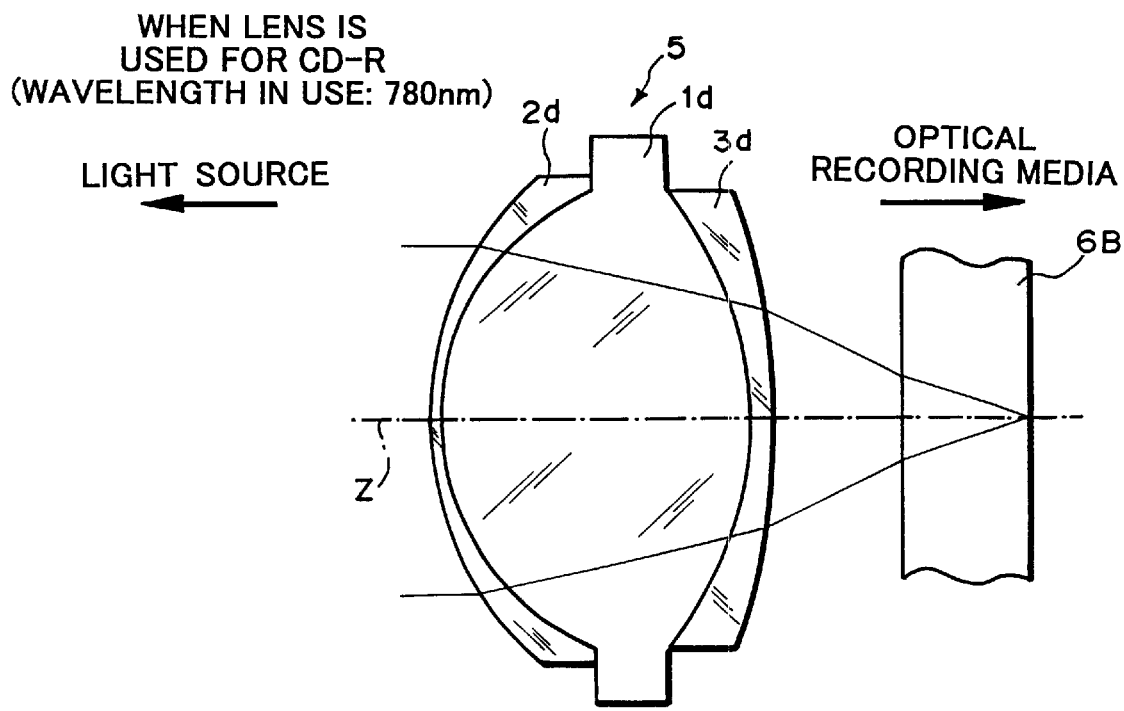
Figure 6A:
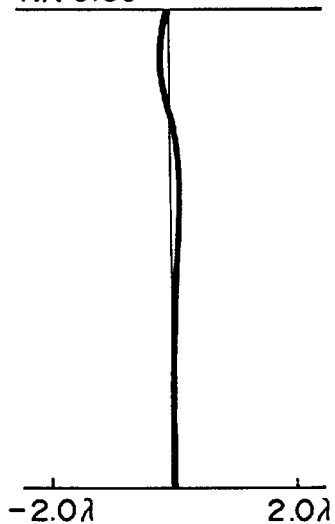
FIGS. 6A and 6B are aberration charts showing wavefront aberrations in Example 1 of the present invention.
Figure 6B:
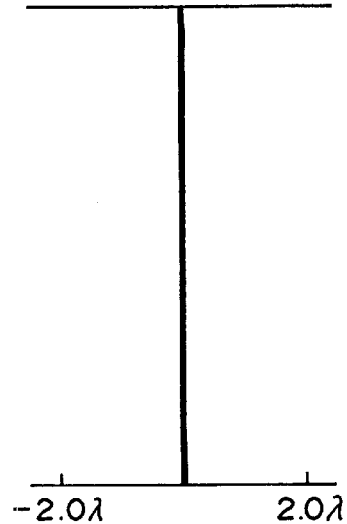
Figure 7A:
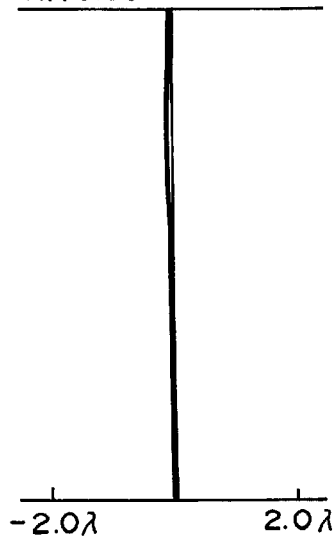
FIGS. 7A and 7B are aberration charts showing wavefront aberrations in Example 2 of the present invention.
Figure 7B:
Figure 8A:
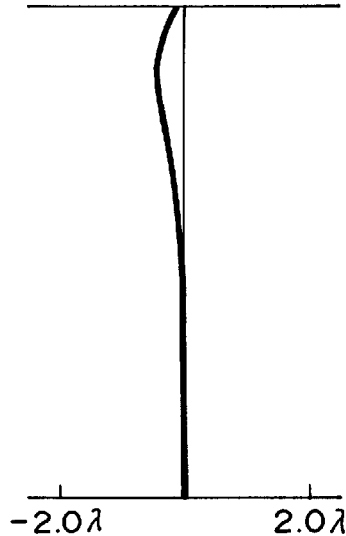
FIGS. 8A and 8B are aberration charts showing wavefront aberrations in Example 3 of the present invention.
Figure 8B:
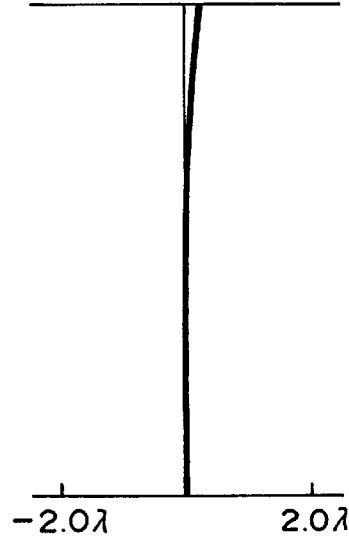
Figure 9A:
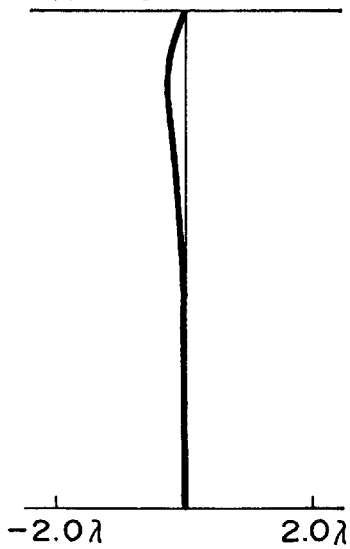
FIGS. 9A and 9B are aberration charts showing wavefront aberrations in Example 4 of the present invention.
Figure 9B:
Figure 10A:
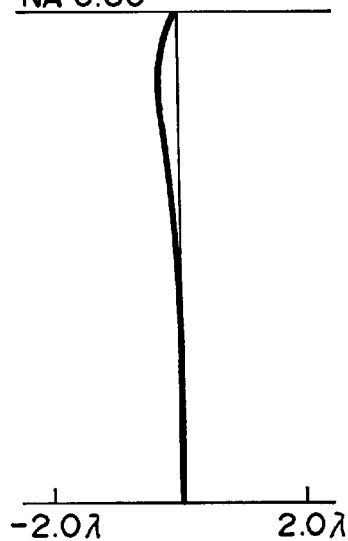
FIGS. 10A and 10B are aberration charts showing wavefront aberrations in Example 5 of the present invention.
Figure 10B:
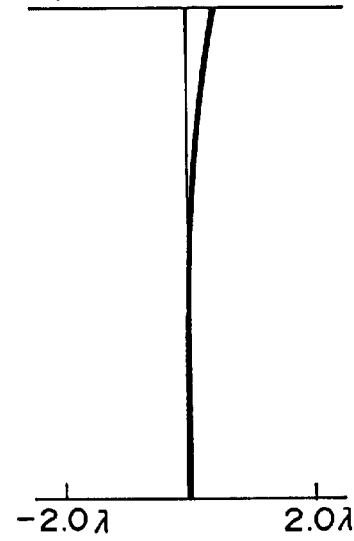

When a CD-R 6B is disposed at a predetermined position (on the turntable) for recording or reproducing as shown in FIG. 1B, on the other hand, the laser beam 12 having a wavelength of 780 nm ($\lambda_2$) is made incident on the objective lens 5 while in a substantially parallel state. In this case, the incident laser beam 12 is converged onto a recording surface of the CD-R 6B by the objective lens 5.

The objective lens 5 in Example 1 comprises, successively from the light source side, a negative meniscus lens 2 having a convex surface constituted by an aspheric surface (represented by the following aspheric surface expression, ditto for the following aspheric surfaces) directed onto the light source side and a biconvex lens 1 having a surface with a weaker curvature constituted by an aspheric surface directed onto the optical recording media side, which are cemented together. Here, the cemented face is an aspheric surface. Since both sides and cemented face of the objective lens 5 are constituted by aspheric surfaces, the freedom in designing of aberration correction and the correcting effect can be improved greatly.

In this Example, the cemented face is made convex toward the light source, the refractive index of the lens 2 on the light source side of the cemented face is made higher than that of the lens 1 on the optical recording media side with respect to the light beam having the wavelength $\lambda_1$, and is made lower than that of the lens 1 on the optical recording media side with respect to the light beam having the wavelength $\lambda_2$, whereby the cemented face can have negative and positive refracting powers with respect to the light beams having the wavelengths $\lambda_1$ and $\lambda_2$, respectively.

When the curvature of the cemented face is enhanced, the spherical aberration can be changed in the positive and negative directions with respect to the light beams having the wavelengths $\lambda_1$ and $\lambda_2$, respectively. Thus, lens design parameters can exist such that the spherical aberration changes in directions opposite from each other depending on whether the CD-R 6B, which is a relatively thick disc, or the DVD 6A, which is a relatively thin disc, is used. Hence, the objective lens 5 having a small spherical aberration commonly used for DVD and CD-R can be realized.

$$Z = \frac{Y^2/R}{1 + (1 - KY^2/R^2)^{1/2}} + \sum_{i=2}^{5} A_i Y^{2i}$$

where

Z is the length of the perpendicular to a tangential plane (plane perpendicular to the optical axis) of an apex of the aspheric surface from a point on the aspheric surface having a distance Y from the optical axis;

Y is the distance from the optical axis;

$A_i$ is the aspheric surface coefficient (i=2 to 5);

R is the radius of curvature of aspheric surface near the optical axis; and

K is the eccentricity.

The upper part of Table 1 (follows) shows lens data (radius of curvature R, surface space D, and refractive index N with respect to $\lambda$=650 nm and 780 nm) of the objective lens 5 in accordance with Example 1.

The middle part of Table 1 indicates the aspheric surface coefficient of each aspheric surface.

The lower part of Table 1 indicates the focal length of objective lens 5, the diameter of luminous flux incident on the objective lens 5, and the numerical aperture of objective lens 5 in each of the cases where DVD and CD-R are set as the optical recording medium.

Example 2

The objective lens 5 in Example 2 comprises, successively from the light source side, a biconvex lens 1a having a surface with a weaker curvature constituted by an aspheric surface directed onto the light source side and a negative meniscus lens 2a having a convex surface constituted by an aspheric surface directed onto the optical recording media side, which are cemented together. Here, the cemented face is an aspheric surface.

In this Example, the cemented face is made convex toward the optical recording media, the refractive index of the lens 1a on the light source side of the cemented face is made lower than that of the lens 2a on the optical recording media side with respect to the light beam having the wavelength $\lambda_1$, and is made higher than that of the lens 2a on the optical recording media side with respect to the light beam having the wavelength $\lambda_2$, whereby the cemented face can have negative and positive refracting powers with respect to the light beams having the wavelengths $\lambda_1$ and $\lambda_2$, respectively.

When the curvature of the cemented face is made greater, the spherical aberration can be changed in the positive and negative directions with respect to the light beams having the wavelengths $\lambda_1$ and $\lambda_2$, respectively. Thus, lens design parameters can exist such that the spherical aberration changes in directions opposite from each other depending on whether the CD-R 6B, which is a relatively thick disc, or the DVD 6A, which is a relatively thin disc, is used. Hence, the objective lens 5 having a small spherical aberration commonly used for DVD and CD-R can be realized.

The upper part of Table 2 (follows) shows lens data (radius of curvature R, surface space D, and refractive index N with respect to $\lambda$=650 nm and 780 nm) of the objective lens 5 in accordance with Example 2.

The middle part of Table 2 indicates the aspheric surface coefficient of each aspheric surface.

The lower part of Table 2 indicates the focal length of objective lens 5, the diameter of luminous flux incident on the objective lens 5, and the numerical aperture of objective lens 5 in each of the cases where DVD and CD-R are set as the optical recording medium.

Example 3

The objective lens 5 in Example 3 comprises, successively from the light source side, a negative meniscus lens 2b having an aspheric convex surface directed onto the light source side and a biconvex lens 1b having a surface with a weaker curvature constituted by an aspheric surface directed onto the optical recording media side, which are cemented together. Here, the cemented face is a spherical surface. Since both sides of the objective lens 5 are constituted by aspheric surfaces, the freedom in designing of aberration correction and the correcting effect can be improved greatly.

The effects of this Example are substantially the same as those of Example 1.

The upper part of Table 3 (follows) shows lens data (radius of curvature R, surface space D, and refractive index N with respect to $\lambda$=650 nm and 780 nm) of the objective lens 5 in accordance with Example 3.

The middle part of Table 3 indicates the aspheric surface coefficient of each aspheric surface.

The lower part of Table 3 indicates the focal length of objective lens 5, the diameter of luminous flux incident on the objective lens 5, and the numerical aperture of objective lens 5 in each of the cases where DVD and CD-R are set as the optical recording medium.

Example 4

The objective lens 5 in Example 4 comprises, successively from the light source side, a biconvex lens 1c having a surface constituted by an aspheric surface directed onto the light source side, and a negative meniscus lens 2c having a convex surface constituted by an aspheric surface directed onto the optical recording media side, which are cemented together. Here, the cemented face is a spherical surface.

The effects of this Example are substantially the same as those of Example 2.

The upper part of Table 4 (follows) shows lens data (radius of curvature R, surface space D, and refractive index N with respect to $\lambda$=650 nm and 780 nm) of the objective lens 5 in accordance with Example 4.

The middle part of Table 4 indicates the aspheric surface coefficient of each aspheric surface.

The lower part of Table 4 indicates the focal length of objective lens 5, the diameter of luminous flux incident on the objective lens 5, and the numerical aperture of objective lens 5 in each of the cases where DVD and CD-R are set as the optical recording medium.

Example 5

The objective lens 5 in Example 5 comprises, successively from the light source side, a negative meniscus lens 2d having a convex surface constituted by an aspheric surface directed onto the light source side, a biconvex lens 1d having a surface with a stronger curvature directed onto the light source side, and a negative meniscus lens 3d having a convex surface constituted by an aspheric surface directed onto the optical recording media side, which are cemented together. Each of the cemented faces is a spherical surface.

The upper part of Table 5 (follows) shows lens data (radius of curvature R, surface space D, and refractive index N with respect to λ=650 nm and 780 nm) of the objective lens 5 in accordance with Example 5.

As can be seen from Table 5, the meniscus lens 2d, biconvex lens 1d, and meniscus lens 3d are configured such that their respective refractive indices with respect to wavelengths of 650 nm ($\lambda_1$) and 780 nm ($\lambda_2$) satisfy the following conditional expressions (7) and (10):

$$N_{1\lambda_1} > N_{2\lambda_1} \text{ and } N_{1\lambda_2} < N_{2\lambda_2} \tag{7}$$

$$N_{2\lambda_1} < N_{3\lambda_1} \text{ and } N_{2\lambda_2} > N_{3\lambda_2} \tag{10}$$

where $N_{1\lambda_1}$ is the refractive index of the meniscus lens 2d (the first lens from the light source side) with respect to the light beam having the wavelength $\lambda_1$;

$N_{2\lambda_1}$ is the refractive index of the biconvex lens 1d (the second lens from the light source side) with respect to the light beam having the wavelength $\lambda_1$;

$N_{3\lambda_1}$ is the refractive index of the meniscus lens 3d (the third lens from the light source side) with respect to the light beam having the wavelength $\lambda_1$;

$N_{1\lambda_2}$ is the refractive index of the meniscus lens 2d (the first lens from the light source side) with respect to the light beam having the wavelength $\lambda_2$;

$N_{2\lambda_2}$ is the refractive index of the biconvex lens 1d (the second lens from the light source side) with respect to the light beam having the wavelength $\lambda_2$; and $N_{3\lambda_2}$ is the refractive index of the meniscus lens 3d (the third lens from the light source side) with respect to the light beam having the wavelength $\lambda_2$.

Further, this Example satisfies the following conditional expressions (11) and (12):

$$N_{1\lambda_1} = N_{3\lambda_1} \tag{11}$$

$$N_{1\lambda_2} = N_{3\lambda_2} \tag{12}$$

The effects obtained by this Example are considered similar to those obtained when Examples 3 and 4, each constituted by two lenses, are combined together. Further, as mentioned above, the first and third lenses from the light source side have the same refractive index, so that they can be formed from the same material, whereby they can be made easily at a lower cost.

The first and third lenses from the light source side may have respective refractive indices different from each other with respect to each of the wavelengths $\lambda_1$ and $\lambda_2$ as a matter of course.

The middle part of Table 5 indicates the aspheric surface coefficient of each aspheric surface.

The lower part of Table 5 indicates the focal length of objective lens 5, the diameter of luminous flux incident on the objective lens 5, and the numerical aperture of objective lens 5 in each of the cases where DVD and CD-R are set as the optical recording medium.

FIGS. 6A to 10B are wavefront aberration charts for Examples 1 to 5 mentioned above. From these charts, it is seen that wavefront aberrations for both DVD and CD-R are made favorable.

The objective lens of the present invention can be modified in various manners without being restricted to that of the above-mentioned embodiment. For example, a plastic material can be used as a material for forming the lenses. Further, a resin curable by heat or light may be molded into a desirable form while being attached to one lens, whereby a thin lens cemented to one lens can be formed.

If the performance up to about NA=0.6 is secured for light having a wavelength of 780 nm ($\lambda_2$), for example, when determining the form of cemented lens surface, then a specific stop (such as a liquid crystal shutter, a wavelength-selective filter, or the like) for adjusting the NA of DVD and CD-R is unnecessary.

The optical recording media to be recorded and reproduced in the optical pickup apparatus of the present invention are not restricted to DVD and CD-R, whereby the present invention is applicable to any case where a single optical pickup apparatus is used for recording and reproducing two optical recording media which are different from each other in terms of the wavelength regions in use and/or thickness of the optical recording media.

Though the optical pickup apparatus in accordance with the above-mentioned embodiment is provided with individual light sources for outputting respective wavelengths of light different from each other, a single light source which can output two wavelengths of light different from each other may be provided instead.

Also, though $\lambda_1 < \lambda_2$ in the above-mentioned embodiment, it can also be $\lambda_2 > \lambda_1$ as a matter of course.

As explained in the foregoing, the objective lens for optical recording media in accordance with the present invention and the optical pickup apparatus using the same utilize a property of a cemented face, such that, when light beams to be used have different wavelengths depending on the thickness of discs, the cemented face exhibits a negative (or positive) refracting power and a positive (or negative) refracting power with respect to light beams having wavelengths $\lambda_1$ and $\lambda_2$, respectively, according to the wavelength-dependent difference in refractive index of materials constituting the lenses.

As the curvature of the cemented face is enhanced, the spherical aberration can be changed in the positive (or negative) direction with respect to light having the wavelength $\lambda_1$ and in the negative (or positive) direction with respect to light having the wavelength $\lambda_2$. Thus, lens design parameters can exist such that the spherical aberration changes in opposite directions depending on whether a relatively thick disc or relatively thin disc is used, thereby making it possible to easily construct an objective lens which can record/reproduce discs having thicknesses different from each other by a single lens.

Therefore, unlike the conventional objective lens for optical recording media and optical pickup apparatus, there is no fear of the apparatus increasing its size, complicating its structure, and raising its manufacturing cost in order to ameliorate its aberration.

TABLE 1

| Lens Surface | Radius of Curvature (R) | Surface Space (D) | Refractive Index (N) λ = 650 nm | λ = 780 nm |
|---|---|---|---|---|
| 1(Aspheric) | 2.66660 | 0.10 | 1.61761 | 1.59876 |
| 2(Aspheric) | 1.97610 | 3.10 | 1.60702 | 1.60008 |
| 3(Aspheric) | −6.61280 |  | 1.00000 | 1.00000 |

When the lens surface is an aspheric surface, the radius of curvature (R) indicates the radius of curvature near the optical axis.

Aspheric Coefficients (1st Surface)

| A2 | $3.027807920 \times 10^{-3}$ |
|---|---|
| A3 | $-2.678026024 \times 10^{-5}$ |
| A4 | $7.590256804 \times 10^{-6}$ |
| A5 | $-7.414318848 \times 10^{-6}$ |
| K | 0.0 |

Aspheric Coefficients (2nd Surface)

| A2 | $1.290766314 \times 10^{-2}$ |
|---|---|
| A3 | $-8.941446210 \times 10^{-4}$ |
| A4 | $-2.734198317 \times 10^{-6}$ |
| A5 | $-5.706310400 \times 10^{-8}$ |
| K | 1.000000000 |

Aspheric Coefficients (3rd Surface)

| A2 | $1.310888519 \times 10^{-2}$ |
|---|---|
| A3 | $-4.927184916 \times 10^{-3}$ |
| A4 | $8.234380791 \times 10^{-4}$ |
| A5 | $-5.883457008 \times 10^{-5}$ |
| K | 0.0 |

DVD

Focal length f=3.614 mm

Incident luminous flux diameter φ=4.34 mm

Numerical aperture NA=0.60

CD-R

Focal length f=3.635 mm

Incident luminous flux diameter φ=3.27 mm

Numerical aperture NA=0.45

TABLE 2

| Lens Surface | Radius of Curvature (R) | Surface Space (D) | Refractive Index (N) λ = 650 nm | λ = 780 nm |
|---|---|---|---|---|
| 1(Aspheric) | 2.66660 | 3.00 | 1.60702 | 1.60008 |
| 2(Aspheric) | −2.03340 | 0.20 | 1.61761 | 1.59876 |
| 3(Aspheric) | −6.61280 |  | 1.00000 | 1.00000 |

When the lens surface is an aspheric surface, the radius of curvature (R) indicates the radius of curvature near the optical axis.

Aspheric Coefficients(1st Surface)

| A2 | $2.890149036 \times 10^{-3}$ |
|---|---|
| A3 | $-5.183197858 \times 10^{-5}$ |
| A4 | $7.730867431 \times 10^{-6}$ |
| A5 | $-8.318471494 \times 10^{-6}$ |
| K | 0.0 |

Aspheric Coefficients(2nd Surface)

| A2 | $-6.333291121 \times 10^{-3}$ |
|---|---|
| A3 | $2.713520032 \times 10^{-3}$ |
| A4 | $-2.384937508 \times 10^{-4}$ |
| A5 | $-2.295935280 \times 10^{-7}$ |
| K | $-4.329785326 \times 10^{-1}$ |

Aspheric Coefficients(3rd Surface)

| A2 | $1.247164921 \times 10^{-2}$ |
|---|---|
| A3 | $-4.894763831 \times 10^{-3}$ |
| A4 | $8.265848030 \times 10^{-4}$ |
| A5 | $-5.954487753 \times 10^{-5}$ |
| K | 0.0 |

DVD

Focal length f=3.626 mm

Incident luminous flux diameter φ=4.35 mm

Numerical aperture NA=0.60

CD-R

Focal length f=3.634 mm

Incident luminous flux diameter φ=3.27 mm

Numerical aperture NA=0.45

TABLE 3

| Lens Surface | Radius of Curvature (R) | Surface Space (D) | Refractive Index (N) λ = 650 nm | λ = 780 nm |
|---|---|---|---|---|
| 1(Aspheric) | 2.91060 | 0.10 | 1.71897 | 1.69680 |
| 2(Spheric) | 2.13220 | 3.10 | 1.70202 | 1.69895 |
| 3(Aspheric) | −10.1102 |  | 1.00000 | 1.00000 |

When the lens surface is an aspheric surface, the radius of curvature (R) indicates the radius of curvature near the optical axis.

Aspheric Coefficients (1st Surface)

| A2 | $2.237489116 \times 10^{-3}$ |
|---|---|
| A3 | $-7.233666142 \times 10^{-5}$ |
| A4 | $4.692685600 \times 10^{-7}$ |
| A5 | $-5.810314248 \times 10^{-6}$ |
| K | 0.0 |

Aspheric Coefficients (3rd Surface

| A2 | $6.418904979 \times 10^{-3}$ |
|---|---|
| A3 | $-3.438843543 \times 10^{-3}$ |
| A4 | $5.734468432 \times 10^{-4}$ |

-continued

| | |
|---|---|
| A5 | $-3.855619631 \times 10^{-5}$ |
| K | 0.0 |

DVD
  Focal length f=3.605 mm
  Incident luminous flux diameter φ=4.33 mm
  Numerical aperture NA=0.60
CD-R
  Focal length f=3.594 mm
  Incident luminous flux diameter φ=3.23 mm
  Numerical aperture NA=0.45

TABLE 4

| Lens Surface | Radius of Curvature (R) | Surface Space (D) | Refractive Index (N) λ = 650 nm | λ = 780 nm |
|---|---|---|---|---|
| 1(Aspheric) | 2.91060 | 3.00 | 1.70202 | 1.69895 |
| 2(Spherical) | −3.49650 | 0.20 | 1.71897 | 1.69680 |
| 3(Aspheric) | −10.1102 | | 1.00000 | 1.00000 |

When the lens surface is an aspheric surface, the radius of curvature (R) indicates the radius of curvature near the optical axis.

Aspheric Coefficients (1st Surface)

| | |
|---|---|
| A2 | $2.200886162 \times 10^{-3}$ |
| A3 | $-7.331349972 \times 10^{-5}$ |
| A4 | $-5.992016310 \times 10^{-7}$ |
| A5 | $-5.644264632 \times 10^{-6}$ |
| K | 0.0 |

Aspheric Coefficients (3rd Surface)

| | |
|---|---|
| A2 | $6.555913398 \times 10^{-3}$ |
| A3 | $-3.388259075 \times 10^{-3}$ |
| A4 | $5.694474379 \times 10^{-4}$ |
| A5 | $-3.880251819 \times 10^{-5}$ |
| K | 0.0 |

DVD
  Focal length f=3.606 mm
  Incident luminous flux diameter φ=4.33 mm
  Numerical aperture NA=0.60
CD-R
  Focal length f=3.594 mm
  Incident luminous flux diameter φ=3.23 mm
  Numerical aperture NA=0.45

TABLE 5

| Lens Surface | Radius of Curvature (R) | Surface Space (D) | Refractive Index (N) λ = 650 nm | λ = 780 nm |
|---|---|---|---|---|
| 1(Aspheric) | 2.65090 | 0.10 | 1.61761 | 1.59876 |
| 2(Spherical) | 2.33460 | 2.90 | 1.60702 | 1.60008 |
| 3(Spherical) | −3.34110 | 0.20 | 1.61761 | 1.59876 |
| 4(Aspheric) | −6.61280 | | 1.00000 | 1.00000 |

When the lens surface is an aspheric surface, the radius of curvature (R) indicates the radius of curvature near the optical axis.

Aspheric Coefficients (1st Surface)

| | |
|---|---|
| A2 | $3.002024251 \times 10^{-3}$ |
| A3 | $-4.479052221 \times 10^{-5}$ |
| A4 | $9.071357422 \times 10^{-6}$ |
| A5 | $-8.541161981 \times 10^{-6}$ |
| K | 0.0 |

Aspheric Coefficients (4th Surface)

| | |
|---|---|
| A2 | $1.272616937 \times 10^{-2}$ |
| A3 | $-5.067044944 \times 10^{-3}$ |
| A4 | $8.661727278 \times 10^{-4}$ |
| A5 | $-6.301100124 \times 10^{-5}$ |
| K | 0.0 |

DVD
  Focal length f=3.602 mm
  Incident luminous flux diameter φ=4.32 mm
  Numerical aperture NA=0.60
CD-R
  Focal length f=3.621 mm
  Incident luminous flux diameter φ=3.26 mm
  Numerical aperture NA=0.45

What is claimed is:

1. An objective lens for optical recording media, said objective lens being constituted by two lenses cemented together and used for recording or reproducing two kinds of optical recording media having thicknesses different from each other with two light beams having wavelengths different from each other, respectively;
  said objective lens satisfying the following conditional expression (1) with respect to a light beam having a wavelength $\lambda_1$ used for recording or reproducing one of said two optical recording media, and
  the following conditional expression (2) with respect to a light beam having a wavelength $\lambda_2$ used for recording or reproducing the other of said two optical recording media:

$$N_{L\lambda 1} > N_{D\lambda 1} \tag{1}$$

$$N_{L\lambda 2} < N_{D\lambda 2} \tag{2}$$

where
  $N_{L\lambda 1}$ is the refractive index of the lens on a light source side with respect to the light beam having the wavelength $\lambda_1$;
  $N_{D\lambda 1}$ is the refractive index of the lens on the optical recording media side with respect to the light beam having the wavelength $\lambda_1$;
  $N_{L\lambda 2}$ is the refractive index of the lens on the light source side with respect to the light beam having the wavelength $\lambda_2$; and
  $N_{D\lambda 2}$ is the refractive index of the lens on the optical recording media side with respect to the light beam having the wavelength $\lambda_2$.

2. An objective lens for optical recording media according to claim 1, wherein one of said light beams having wavelengths $\lambda_1$ and $\lambda_2$ is a light beam having a wavelength of 650 nm used for recording or reproducing DVD, whereas the other is a light beam having a wavelength of 780 nm used for recording or reproducing CD-R.

3. An objective lens for optical recording media according to claim 1, wherein said cemented face of lenses is an aspheric surface.

4. An optical pickup apparatus comprising the objective lens for optical recording media according to claim 1.

5. An objective lens for optical recording media, said objective lens being constituted by two lenses cemented together and used for recording or reproducing two kinds of optical recording media having thicknesses different from each other with two light beams having wavelengths different from each other, respectively;

said objective lens satisfying the following conditional expression (3) with respect to a light beam having a wavelength $\lambda_1$ used for recording or reproducing one of said two optical recording media, and the following conditional expression (4) with respect to a light beam having a wavelength $\lambda_2$ used for recording or reproducing the other of said two optical recording media:

$$N_{L\lambda 1} < N_{D\lambda 1} \tag{3}$$

$$N_{L\lambda 2} > N_{D\lambda 2} \tag{4}$$

where $N_{L\lambda 1}$ is the refractive index of the lens on a light source side with respect to the light beam having the wavelength $\lambda_1$;

$N_{D\lambda 1}$ is the refractive index of the lens on the optical recording media side with respect to the light beam having the wavelength $\lambda_1$;

$N_{L\lambda 2}$ is the refractive index of the lens on the light source side with respect to the light beam having the wavelength $\lambda_2$; and $N_{D\lambda 2}$ is the refractive index of the lens on the optical recording media side with respect to the light beam having the wavelength $\lambda_2$.

6. An objective lens for optical recording media according to claim 5, wherein one of said light beams having wavelengths $\lambda_1$ and $\lambda_2$ is a light beam having a wavelength of 650 nm used for recording or reproducing DVD, whereas the other is a light beam having a wavelength of 780 nm used for recording or reproducing CD-R.

7. An objective lens for optical recording media according to claim 5, wherein said cemented face of lenses is an aspheric surface.

8. An optical pickup apparatus comprising the objective lens for optical recording media according to claim 5.

9. An objective lens for optical recording media, said objective lens being constituted by two lenses cemented together and used for recording or reproducing two kinds of optical recording media having thicknesses different from each other with two light beams having wavelengths different from each other, respectively;

assuming that said optical recording medium recorded or reproduced with a light beam having a wavelength $\lambda_1$ and said optical recording medium recorded or reproduced with a light beam having a wavelength $\lambda_2$ have respective thicknesses $t_1$ and $t_2$ satisfying the condition of $t_1 < t_2$, said objective lens satisfying the following conditional expression (5) when said cemented face of said cemented lenses is convex toward a light source, and the following conditional expression (6) when said cemented face of said cemented lenses is convex toward said optical recording media:

$$N_{L\lambda 1} > N_{D\lambda 1} \text{ and } N_{L\lambda 2} < N_{D\lambda 2} \tag{5}$$

$$N_{L\lambda 1} < N_{D\lambda 1} \text{ and } N_{L\lambda 2} > N_{D\lambda 2} \tag{6}$$

where $N_{L\lambda 1}$ is the refractive index of the lens on the light source side with respect to the light beam having the wavelength $\lambda_1$;

$N_{D\lambda 1}$ is the refractive index of the lens on the optical recording media side with respect to the light beam having the wavelength $\lambda_1$;

$N_{L\lambda 2}$ is the refractive index of the lens on the light source side with respect to the light beam having the wavelength $\lambda_2$; and $N_{D\lambda 2}$ is the refractive index of the lens on the optical recording media side with respect to the light beam having the wavelength $\lambda_2$.

10. An objective lens for optical recording media according to claim 9, wherein one of said light beams having wavelengths $\lambda_1$ and $\lambda_2$ is a light beam having a wavelength of 650 nm used for recording or reproducing DVD, whereas the other is a light beam having a wavelength of 780 nm used for recording or reproducing CD-R.

11. An objective lens for optical recording media according to claim 9, wherein said cemented face of lenses is an aspheric surface.

12. An optical pickup apparatus comprising the objective lens for optical recording media according to claim 9.

13. An objective lens for optical recording media, said objective lens being constituted by three lenses cemented together and used for recording or reproducing two kinds of optical recording media having thicknesses different from each other with two light beams having wavelengths different from each other, respectively;

assuming that said optical recording medium recorded or reproduced with a light beam having a wavelength $\lambda_1$ and said optical recording medium recorded or reproduced with a light beam having a wavelength $\lambda_2$ have respective thicknesses $t_1$ and $t_2$ satisfying the condition of $t_1 < t_2$, said objective lens satisfying the following conditional expression (7) when the cemented face between the first and second lenses from a light source side is convex toward said light source:

$$N_{1\lambda 1} > N_{2\lambda 1} \text{ and } N_{1\lambda 2} < N_{2\lambda 2} \tag{7}$$

said objective lens satisfying the following conditional expression (8) when the cemented face between the first and second lenses from the light source side is convex toward said optical recording media:

$$N_{1\lambda 1} < N_{2\lambda 1} \text{ and } N_{1\lambda 2} > N_{2\lambda 2} \tag{8}$$

said objective lens satisfying the following conditional expression (9) when the cemented face between the second and third lenses from the light source side is convex toward said light source:

$$N_{2\lambda 1} > N_{3\lambda 1} \text{ and } N_{2\lambda 2} < N_{3\lambda 2} \tag{9}$$

said objective lens satisfying the following conditional expression (10) when the cemented face between the second and third lenses from the light source side is convex toward said optical recording media:

$$N_{2\lambda 1} < N_{3\lambda 1} \text{ and } N_{2\lambda 2} > N_{3\lambda 2} \tag{10}$$

where $N_{1\lambda 1}$ is the refractive index of the first lens from the light source side with respect to the light beam having the wavelength $\lambda_1$;

$N_{2\lambda_1}$ is the refractive index of the second lens from the light source side with respect to the light beam having the wavelength $\lambda_1$;

$N_{3\lambda_1}$ is the refractive index of the third lens from the light source side with respect to the light beam having the wavelength $\lambda_1$;

$N_{1\lambda_2}$ is the refractive index of the first lens from the light source side with respect to the light beam having the wavelength $\lambda_2$;

$N_{2\lambda_2}$ is the refractive index of the second lens from the light source side with respect to the light beam having the wavelength $\lambda_2$; and $N_{3\lambda_2}$ is the refractive index of the third lens from the light source side with respect to the light beam having the wavelength $\lambda_2$.

14. An objective lens for optical recording media according to claim 13, satisfying the following conditional expressions (11) and (12):

$$N_{1\lambda_1} = N_{3\lambda_1} \tag{11}$$

$$N_{1\lambda_2} = N_{3\lambda_2} \tag{12}$$

15. An objective lens for optical recording media according to claim 13, wherein said first and third lenses from said light source side are formed from the same material.

16. An objective lens for optical recording media according to claim 13, wherein one of said light beams having wavelengths $\lambda_1$ and $\lambda_2$ is a light beam having a wavelength of 650 nm used for recording or reproducing DVD, whereas the other is a light beam having a wavelength of 780 nm used for recording or reproducing CD-R.

17. An objective lens for optical recording media according to claim 13, wherein at least one of said cemented faces of lenses is an aspheric surface.

18. An optical pickup apparatus comprising the objective lens for optical recording media according to claim 13.

* * * * *